INVENTOR.
FRANK J. URBAN
BY
Kimmel & Crowell
ATTORNEYS.

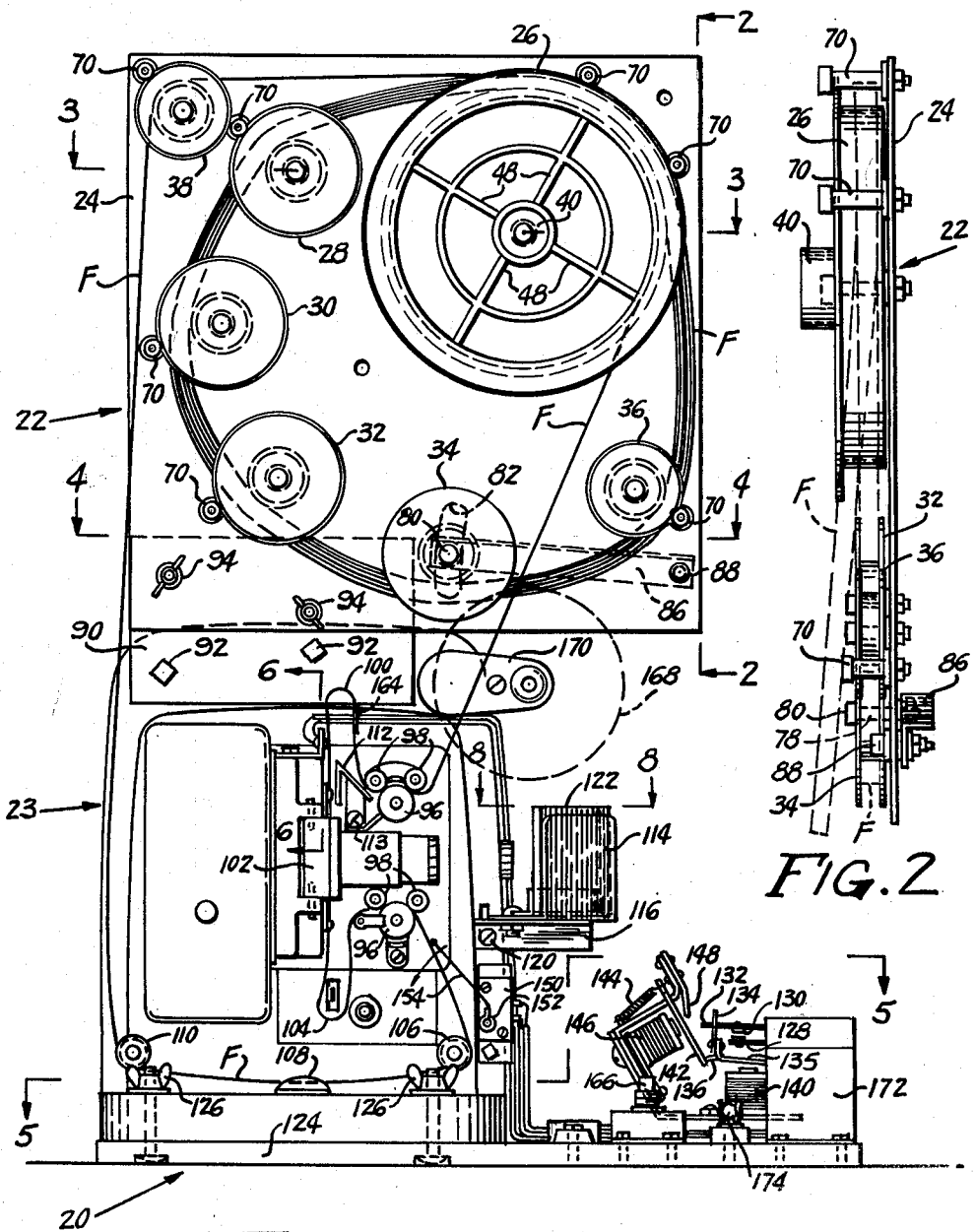

Sept. 1, 1964　　　　F. J. URBAN　　　　3,147,482
CONTINUOUS FILM PROJECTION DEVICE
Filed Jan. 18, 1963　　　　　　　　　　3 Sheets-Sheet 3

INVENTOR.
FRANK J. URBAN
BY
Kimmel & Crowell
ATTORNEYS.

United States Patent Office 3,147,482
Patented Sept. 1, 1964

3,147,482
CONTINUOUS FILM PROJECTION DEVICE
Frank J. Urban, Louisville, Ky., assignor to Urban Industries, Inc., Louisville, Ky., a corporation of Kentucky
Filed Jan. 18, 1963, Ser. No. 252,334
10 Claims. (Cl. 352—128)

This invention relates to a continuous film projection device and relates more particularly to such a device wherein there is provided a continuous or endless film wound loosely about a plurality of rollers and provided with sufficient slack to run the same through a projector, the drive for the film being effected solely by the drive mechanism of the projector.

A primary object of this invention is the provision of a device of the type described which is inexpensive to manufacture, sturdy and reliable in construction and easy to use.

Another object of this invention is the provision of a continuous film projection device which may be readily employed with an ordinary projector.

A further object of the instant invention is to provide such a device wherein the drive imparted by the drive sprocket of a projector is assisted by means of a large wheel in such a manner that the relatively light pull of the projector sprocket will unreel the film from a multiplicity of rollers or reels with a minimum of effort and difficulty, and without exerting undue strain or stress on any portion of the film.

Another object of this invention is the provision of a continuous film projector device having a magazine which obviates the necessity of any correlating gearing or the like between the magazine and the projector and which will adapt itself automatically not only to various types of projectors, but various speeds of projection.

Still another object of the instant invention is to provide such a device wherein tension is maintained wholly by means of the lowermost roller or reel of a series of rollers or reels on the magazine, the latter being pivotally mounted so that by weight of gravity it effectively takes up any excessive slack in the reeled film.

A further object of the instant invention is the provision of a device of the character described having means whereby film may be rolled thereon from a conventional reel with a minimum of effort and difficulty and then spliced to provide a continuous film reel which may be reprojected as many times as desired, either continuously or, at the will of the operator, intermittently.

A further object of the instant invention is to provide such a device having a magazine for holding a reel of film which may be easily removed from the projector and replaced by another magazine holding a different reel of film.

An additional object of this invention is the provision of a continuous film projection magazine wherein the film is loosely rolled upon a plurality of rollers on the magazine so that there is a minimum of surface contact between superimposed portions of the coiled film and to allow the passage of air between such portions to increase the efficiency of the device and decrease the wear on the film.

A still further object of this invention is the provision of a device such as hereinbefore described having means to avoid the accidental displacement of the coiled film from its plurality of rollers.

Another object of the instant invention is the provision of a continuous film projection device having electrical circuitry associated therewith to provide optimum operating characteristics and to allow great flexibility in use.

A further object of the instant invention is the provision of such a device having means to stop the projection at predetermined points to allow a single continuous reel of film to be shown in chosen portions.

A further object of the instant invention is to provide such a sequencing means which is actuated by the passage of the film and which comprises a pair of spaced contacts which are closed by the passage of a portion of the film having a small dab of a metallizing agent on its surface.

Another object of this invention is to provide a continuous film projection device having means to automatically shut off the operation thereof in the event of a break in the film.

A still further object of the instant invention is to provide a continuous film projection device associated with a conventional trip-coin chute switch to allow the device to be used in a commercial establishment.

A further object of this invention is the provision of a projection device, particularly of the continuous type, having means to avoid the conventional loop of film immediately preceeding the lens of the projector from being twisted and caught in the drive sprocket mechanism.

Other and further objects reside in the combination of elements, arrangement of parts and features of construction.

Still other objects will in part be obvious and in part be pointed out as the description of the invention proceeds and as shown in the accompanying drawings wherein:

FIGURE 1 represents a front elevational view of the device of the instant invention associated with a projector modified in accordance with certain preferred embodiments of this invention;

FIGURE 2 is an enlarged fragmentary side elevational view, particularly of the magazine portion of the device of the instant invention taken on line 2—2 of FIGURE 1, with the film shown in dotted lines;

Like reference characters refer to like parts throughout the several views of the drawings.

Figure 3:
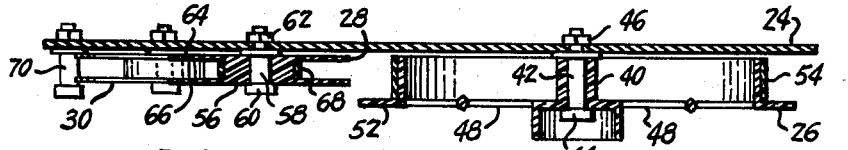
FIGURE 3 is an enlarged transverse cross sectional view through a portion of the magazine, taken on line 3—3 of FIGURE 1.
Figure 4:
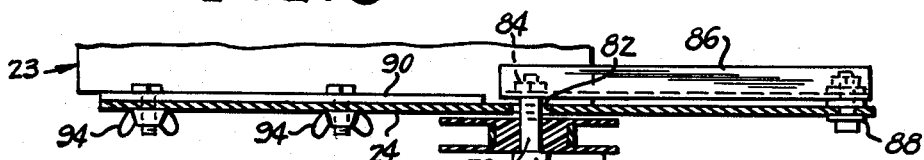
FIGURE 4 is an enlarged transverse cross sectional view through another portion of the magazine, taken on line 4—4 of FIGURE 1, with parts broken away for illustrative clarity.

Referring now to the drawings in general and more particularly to FIGURE 1, the continuous film projection device of the instant invention is indicated generally by the reference numeral 20 and is comprised basically of a magazine 22 and a projector 23.

The magazine 22 includes a supporting plate 24 of generally rectangular shape on which are rotatably mounted a relatively large main reel 26, a plurality of idlers 28, 30 and 32, a tension reel 34, a small idler 36 and a feed idler 38.

The main reel 26 is mounted adjacent one corner of the supporting plate 24 and comprises a hub 40 supported on a post 42 having an enlarged head 44 and threadably secured by a nut 46 in the supporting plate 24. A plurality of spokes 48 radiate from the hub 40 and a rim 50 is provided with a single angular flange 52 on the side of the main reel 26 away from the mounting plate 24. The post 42 is of sufficient length to allow limited play of the main reel 26 between the enlarged head 44 and the mounting plate 24. This play is permitted to allow for any deviations in the tracking of the film as well as minor disalignment thereof in use. Rim 50 is provided with a peripheral driving band 54 which may be comprised of rubber or other similar friction material and which may have protruding from the face thereof a series of raised projections (not shown) spaced to engage the conventional sprocket openings of the film, although it has been found in practice that these projections are not necessary and that the friction afforded by the band 54 is sufficient to move the film in a manner which will be more fully described hereinafter. The large size of the main reel 26 provides a great peripheral contact with the film F and thereby assist the pulling power transmitted from the projector driving means.

Each of the idlers 28, 30, 32, 36 and 38 are substantially identical in construction so that only one will be described in detail. Referring particularly to FIGURE 3, the idler 28 is comprised of a hub 56 which is mounted for rotation on a post 58 having an enlarged head 60 and threadably secured in the supporting plate 24 by a nut 62. Extending radially outward from the hub 56 are a pair of spaced flanges 64 and 66 which serve as guides for the film F. There is a limited amount of play along the axis of the post 58, such playing being materially less than that permitted main reel 26, since any deviations laterally of the direction of movement of the film F may be compensated for by the main reel 26. A peripheral band of friction material 68 is also provided on the hub of each idler to increase engagement with the film F.

Figure 9:
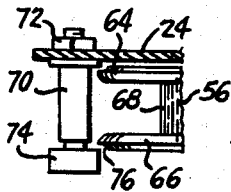
FIGURE 9 is an enlarged fragmentary detailed view of the means for avoiding the accidental displacement of the film from the reels on the magazine of the device of the instant invention, with parts broken away for illustrative convenience.

Referring to the enlarged detail in FIGURE 9, restraining posts 70 are threadably secured by nuts 72 adjacent peripheral edges of each of the main reel 26 and idlers 28, 30, 32, 36 and 38 to maintain the film F between the flanges 64 and 66. The restraining posts 70 have enlarged heads 74 slightly overlying the peripheral edge of the outer flange 66 which preferably has a slight circumferential depression 76 in which the head 74 of the restraining posts 70 may ride.

The idler 36 is substantially identical in construction to the other idlers except that it is of slightly less diameter, serving as a primary guide immediately adjacent the main reel 26.

Similarly, the idler 38 is substantially identical in construction except that it is positioned in the opposite corner from the main reel 26 so that the film F being fed from its hub approaches the rim 50 of the main reel 26 substantially tangentially.

The tension reel 34 serves as a gravity actuated tensioning device for the film F and differs only from the idlers hereinbefore described by being rotatably mounted on a post 78 having an enlarged head 80. The post 78 passes through an arcuate slot 82 in the mounting plate 24 to be threadably secured by a nut 84 at one end of a right angular tension arm 86 pivotally mounted at 88 to the rear of the supporting plate 24. The spaced flanges on the tension reel 34 accommodate the film F and since the tension reel 34 is the lowermost reel when the magazine 22 is positioned for use, the force of gravity causes the tension reel 34 to impart a slight but measurable tension to the entire film assembly.

The magazine 22 is preferably releasably secured to a mounting plate 90 fixed by any conventional means 92 to the projector 23 and upwardly extending therefrom. In the embodiment shown, a pair of bolts and wing nuts 94 are readily passed through aligned apertures in the mounting plate 90 and supporting plate 24.

It is to be understood that the projector 23 may be of any conventional design. The embodiment shown has a pair of drive sprockets 96 which provide the entire driving force for the continuous film projection device of the instant invention. The film F passes over the upper guide sprocket 96 and under idler rollers 98 to form an upper loop 100 before passing through the lens housing 102. The film F is then formed into a lower loop 104 and passes upwardly over the lower drive sprocket 96 and under the lower idlers 98. From the lower drive sprocket 96 the film F passes over idler 106, through guide plate 108 and under idler 110 to return to the feed idler 38 of the magazine 22.

A number of modifications to the conventional projector have been illustrated as useful with the device of the instant invention. One such modification is an inverted V-shaped angular plate 112 mounted on the projector beneath the upper loop 100 of the film F. This plate 112 is particularly useful with a continuous film projection device such as in the instant invention, since after the film F sits in unused state for a length of time, the loop 100 tends to hold its shape or to be set in the film F and on starting the projector 23, twists beneath the upper drive sprocket 96 and gets caught in the driving mechanism. The angular plate 112 avoids this problem by catching the loop 100 and not allowing it to get twisted until the drive sprockets 96 move the curved portion through the system thereby straightening it out. The plate 112 can be adjustably secured to the projector 23 as by a screw 113 or the like for slight angular displacement to best accommodate the loop 100.

Figures 6, 7, 8:
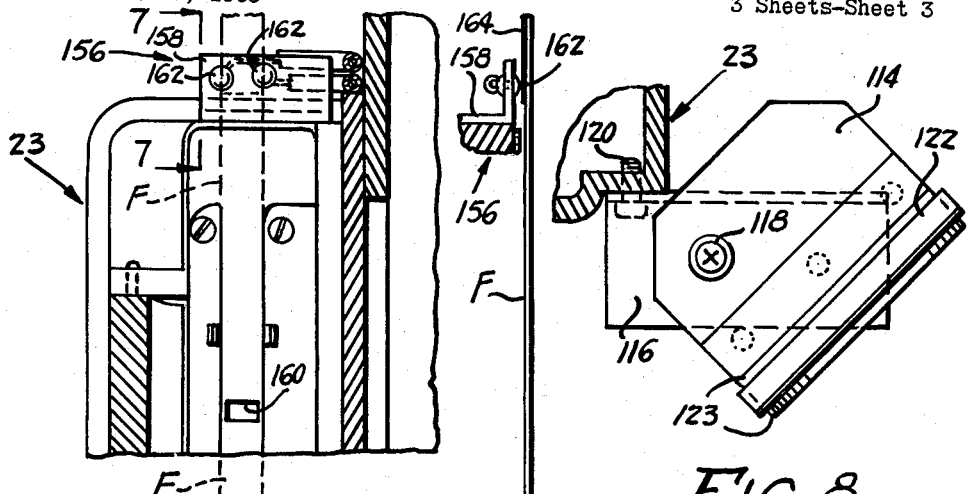
FIGURE 6 is an enlarged fragmentary cross sectional view taken on line 6—6 of FIGURE 1 and showing the operation of the sequencing mechanism of the instant invention, with the film shown in dotted lines and with parts broken away for illustrative convenience.
FIGURE 7 is a cross sectional view of the sequencing mechanism taken on line 7—7 of FIGURE 6, with parts broken away for illustrative convenience.
FIGURE 8 is an enlarged fragmentary cross sectional view of a reflecting mirror for use with the instant invention, taken on line 8—8 of FIGURE 1, with parts broken away.

A further modification of the conventional projector is the mirror bracket 114 shown enlarged in FIGURE 8 which is pivotally secured at 118 to a mounting plate 116 fixed to the projector 23 by any conventional means 120. A mirror 122 is supported between upstanding flanges 123 on the mirror bracket 114 and acts to reflect the image from the projector onto an enlarged screen (not shown) or onto the rear of a one-way viewing mirror (not shown). Thus, the projector 23 may be secured within a viewing cabinet (not shown) in any desired position while the mirror 122 may be pivoted about its mounting at 118 to direct the image in a different location than the normal projection.

Figure 5:
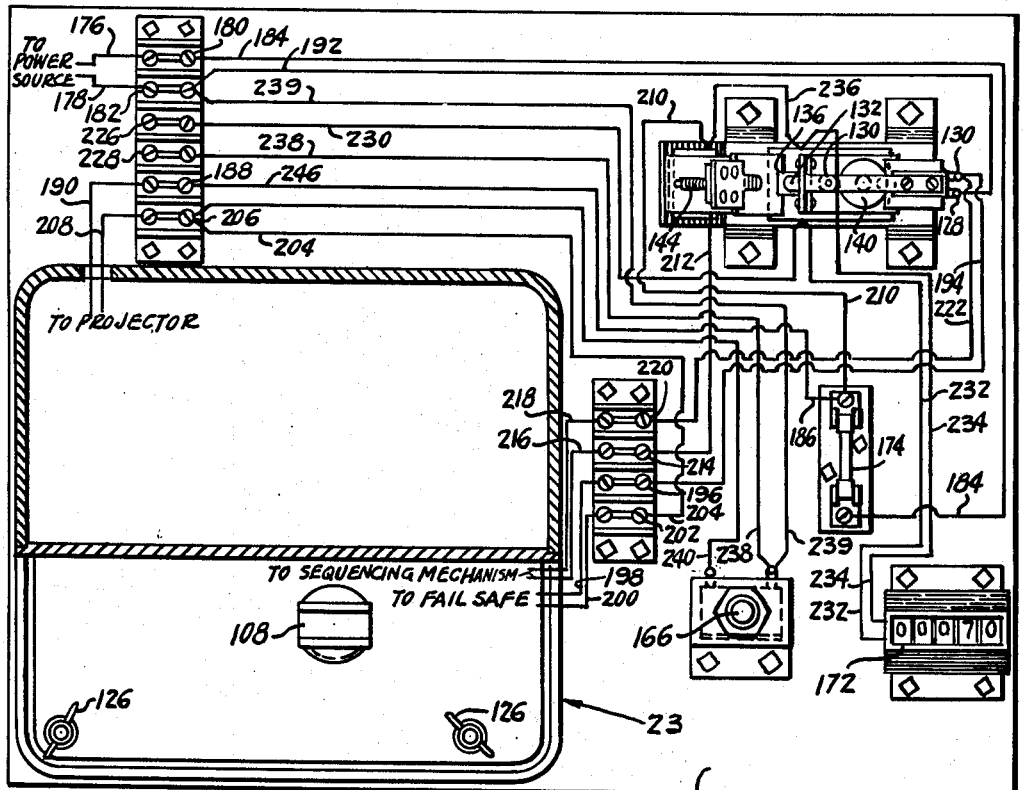
FIGURE 5 is an enlarged transverse cross sectional view through the projector taken on line 5—5 of FIGURE 1 and showing the actual electrical circuitry of the device of the instant invention.

The projector 23 is preferably mounted on a support member 124 by any conventional means such as the bolts and wing nuts 126 seen in FIGURES 1 and 5. Also supported on the plate 124 are the various components necessary to the electrical circuitry of the device of the instant invention.

A lower contact 128 is supported on a spring metal tongue and is normally spaced from an upper contact 130 supported on a similar spring metal tongue having an extension 132. The extension 132 passes through a slot (not shown) in an insulated member 134 on a locking mechanism 135 having a locking detent 136 and being normally maintained in an upward position by a spring means (not shown) pivotally supporting it within the housing 138. A hold electro-magnet 140, when energized, pulls the locking mechanism 135 in a downward direction against the force of the spring (not shown) and the locking detent 136 rides under, and is held down by a locking plate 142 spring pressed at 144 to maintain the elements in locked position. When the locking mechanism 135 has been drawn downwardly by the hold electro-magnet 140, the extension 132 is pulled downwardly therewith by the insulated member 134 and the contacts 128 and 130 are engaged to close the circuit and actuate the projector 23 in a manner to be more fully explained hereinafter.

A release electro-magnet 146, when energized, withdraws the locking plate 142 against the action of the spring 144 and allows the locking detent 136 to be released therefrom to disengage the contacts 128 and 130 and open the circuit. A stop member 148 is provided extending over the plate 142 to limit its upward movement.

An automatic cutoff or "fail safe" 150 includes a normally open micro-switch 152 and a spring steel arm 154 which normally rests on the film F and maintains the micro-switch 152 closed when the film is substantially taut between lower driving sprocket 96 and the idler 106. Note FIGURE 1. If the film should break anywhere along its length and the tension is relieved between the lower driving sprocket 96 and the idler 106, the arm 154 drops and the micro-switch 152 returns to its normally open position thereby breaking the circuit and stopping the projector 23.

A sequencing mechanism 156 is shown in FIGURES 6 and 7 and comprises a right angular plate 158 mounted directly above the lens opening 160 in the projector 23 and having a pair of spaced contacts 162—162 projecting therefrom. As the film F proceeds from the upper loop 100 through the lens housing 102 it comes into engagement with the contacts 162. When the circuit between the contacts 162—162 is closed the release electro-magnet 146 is energized as will be more fully explained hereinafter and the locking detent 136 is released to disengage the contacts 128 and 130 thereby stopping the projector 23. The circuit between the contacts 162—162 can be closed at any desired point in the film sequence by dabbing a little metallic paint such as silver paint or the like 164 on the film F at desired points. Thus, whenever the silver paint 164 closes the circuit between the contacts 162—162, the sequence will be completed and the projector 23 will be stopped. The time interval between the dabs of paint can be easily varied by simply rubbing the paint 164 off with the fingers and applying a new dab at a different position of the film F.

A testing switch 166 is provided in the circuit to detect if everything is in order. By closing the switch 166 the circuit to the projector 23 will be closed, bypassing the contacts 128 and 130 as explained further hereinafter. This switch 166 may be used either as a testing device or to wind the film F from its original reel onto the magazine 22 in a manner to be further described in more detail hereinafter. The original reel is shown in dotted lines at 168 in FIGURE 1 as rotatably mounted on an arm 170 on the projector 23. The test switch 166 is spring-pressed and has no locking position so that it cannot be accidentally left on. Once the finger of the operator is removed it will automatically return to its open position thereby cutting off power to the projector 23. Of course, a locking means may be included if desired.

A counter 172 is also provided in the circuit to determine the number of sequences which have been projected by the device and functions in a well known manner.

A fuse 174 will automatically open the circuit in case it becomes overheated for any reason and is merely a safety element.

To follow the actual circuitry, reference is made to FIGURE 5 where the power comes in from a normal A.C. circuit source (not shown) through conductors 176 and 178 which are respectively connected to terminals 180 and 182 fixed to the mounting member 124. From terminal 180, conductor 184 extends to one end of the fuse 174 and from the other end of the fuse 174 conductor 186 extends to terminal 188 from which conductor 190 is connected to the projector 23. In order to complete the circuit to the projector 23 a conductor 192 extends from terminal 182 to contact 128 and a conductor 194 extends from contact 130 to a terminal 196 from which a conductor 198 extends to one contact on the micro-switch 152 of the fail safe 150. From the other contact on the micro-switch 152 a conductor 200 extends to terminal 202 from which a conductor 204 extends to terminal 206 which has a conductor 208 completing the circuit to the projector 23. Thus, if the fail safe is closed as it would be with the film under normal tension and when the contacts 128 and 130 are engaged current will flow from the conductors 176 and 178 through the circuit to the conductors 190 and 208 leading into the projector thereby actuating the same.

In order to stop the projector 23 once it has been started, it is necessary either to open the fail safe micro-switch 152 by causing a release in the tension of the film F or to open the contacts 128 and 130 by energizing the release electro-magnet 146 to withdraw the locking member 142 and release the locking detent 136. To effect this end an additional conductor 210 extends from the other end of the fuse 174 to one end of the release electro-magnet 146. From the other end of the release electro-magnet 146 a conductor 212 extends to a terminal 214 from which a conductor 216 extends to one of the contacts 162 on the sequencing mechanism 156. From the other contact 162 a conductor 218 extends to a terminal 220 from which a conductor 222 extends to the contact 130. It will be seen that when the projector is running and the contacts 128 and 130 are engaged current will pass to the release coil 146 when the circuit is closed through the contacts 162—162 of the sequencing mechanism 156. The release electro-magnet 146 will then pull the plate 142 downward about its pivotal support releasing the locking detent 136 and opening the contacts 128 and 130. Thus, the current to the projector 23 will be stopped whenever a dab or silver paint or the like 164 electrically connects the contacts 162—162.

Figure 10:
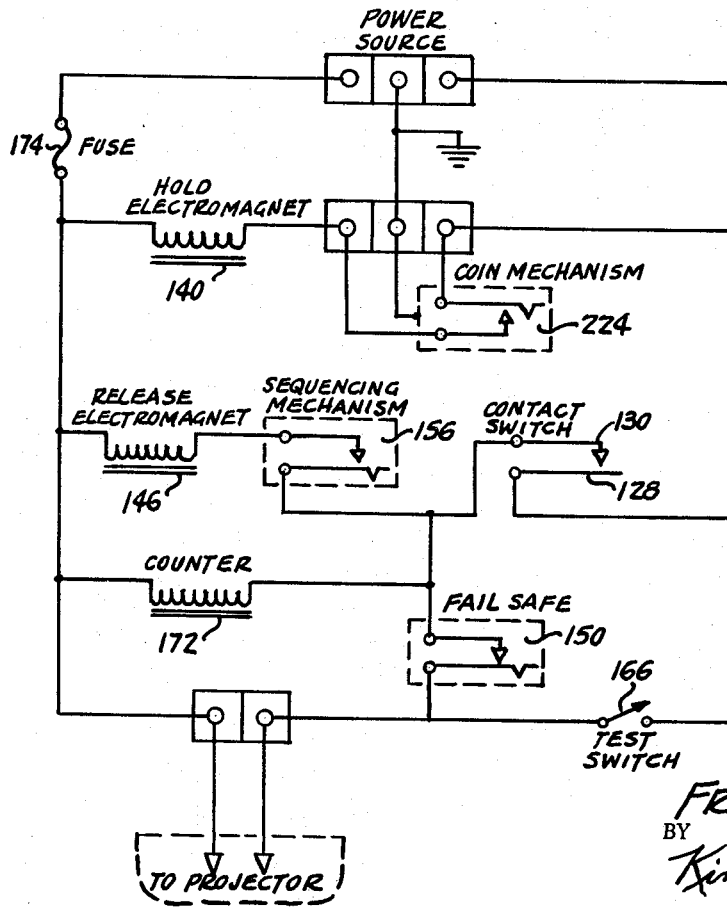
FIGURE 10 is a schematic diagram of the circuitry for the continuous film magazine device of the instant invention.

The hold electro-magnet 140 is actuated by a coin mechanism of conventional structure and not shown in FIGURES 1 to 9 but indicated schematically at 224 in FIGURE 10. This mechanism 224 would be inserted between the terminals 226 and 228 shown in FIGURE 5 and a conductor 230 would extend from the terminal 226 to hold electro-magnet 140 while a conductor 232 would connect this terminal of the hold electro-magnet 140 with the counter 172. The other end of the counter 172 would be connected by conductor 234 to the other side of the hold electro-magnet 140. A conductor 236 extends between the hold electro-magnet 140 and the release electro-magnet 146 and a conductor 238 extends from the terminal 228 to the same contact on the test switch 166 to which a conductor 239 from the power source is connected to complete the circuitry between these elements. Thus, when the circuit in the coin mechanism 224 is closed by insertion of a coin in the conventional manner, current will flow through the hold electro-magnet 140 to energize the same and withdraw the locking mechanism 135 until the locking detent 136 is caught beneath the locking plate 142 and the contacts 128 and 130 are engaged to start the projector. Each time the projector is restarted the counter will so indicate in the conventional manner.

Finally, a conductor 240 connects the other side of the test switch 166 with the terminal 188 to complete the circuitry to this element.

The schematic circuit diagram is shown in FIGURE 10 and is self-explanatory.

The use and operation of the continuous film projection device of the instant invention will now be apparent. In initially placing a continuous film in the magazine 22, the film F is unwound from the conventional reel 168 shown in dotted lines in FIGURE 1 and passed therefrom over feed idler 38 and thence over main reel 26. The film is then manually threaded about idler 36, tension reel 34 and idlers 32, 30 and 28 and then is lightly taped by means of a piece of pressure sensitive adhesive tape (not shown) to the inside of the film coming from the feed idler 38. Main reel 26 may then be rotated by means of the spokes 48 until all of the film is unwound from the reel 168. The previously taped end of the film F is then disassociated from the interior of the coiled film by removal of the tape and is extended outwardly from the coil over the upper driving sprocket 96 to form the upper loop 100, through the lens housing 102 to form the lower loop 104 and thence over the lower driving sprocket 96 from which it passes over idlers 106 and 110 and then is spliced as by means of a tape (not shown) or other conventional splicing means to the opposite end of the film F extending downwardly from feed idler 38. This completes the coil of continuous film. The device may be tested as by means of the switch 166. After everything is found to be in order, the projection may be started by placing a coin in the coin mechanism 224 or any other means of closing the contacts 128 and 130. Projection will continue until the dab of silver paint 164 closes the circuit between the contacts 162—162 of the sequencing mechanism 156 thereby providing current to the release electro-magnet 146 and opening the circuit to stop the projection. If at any time the film F breaks or otherwise becomes unduly slack, the fail safe 150 will break the circuit and stop the projector to indicate to the operator that something is wrong.

It will now be seen that there is herein provided a continuous film projection device which satisfies all the objectives of the instant invention and others, including many advantages of great practical utility and commercial importance.

Since many embodiments may be made of this inventive concept, and since many modifications may be made of the embodiments hereinbefore shown and described, it is to be understood that all matter herein is to be interpreted merely as illustrative and not in a limiting sense.

I claim:

1. A continuous film projection device comprising a projector having at least one drive means and a lens opening, a magazine supported adjacent said projector, said magazine including a supporting plate, a main reel and a plurality of idler reels arranged with said main reel on said supporting plate in non-contacting relation in substantially the form of a circle, said main reel and said idler reels being rotatably mounted on said supporting plate whereby a strip of film may extend about said main reel and said idler reels in a continuous coil having an innermost and an outermost layer with the innermost layer of the coil extending through said drive means of said projector to form an inverted U-shaped loop, passing said lens opening and returning to form the outermost layer of the coil, electrical power being provided to energize said drive means from a remote source, an electrical circuit between said source and said drive means, a pair of normally spaced contacts in said circuit, means to move said contacts into engaging relationship thereby closing said circuit, locking means to hold said contacts in engaging relationship and releasing means to release said locking means and open said circuit thereby, one of said contacts being mounted on a spring metal tongue in overlying relation to the other of said contacts, said tongue having an extension extending outwardly beyond said other contact, an insulated member having a slot defined therein, said extension passing through said slot, said locking means secured to said insulated member and having a locking detent, a pivotally mounted locking plate normally biased toward said locking detent, and means to pull said locking means downwardly whereby said locking detent is engaged by said locking plate and said contacts are moved into and held in engaging relationship.

2. A continuous film projection device in accordance with claim 1 wherein said means to pull said locking means downwardly includes a hold electro-magnet and means to energize said hold electro-magnet.

3. A continuous film projection device in accordance with claim 2 wherein said means to energize said hold electro-magnet are coin actuated.

4. A continuous film projection device in accordance with claim 1 wherein said releasing means includes a release electro-magnet in juxtaposition to said locking plate, said release electro-magnet, when energized, withdrawing said locking plate to release said locking detent and open said circuit and means to energize said release electro-magnet.

5. A continuous film projection device in accordance with claim 4 wherein said release electro-magnet is energized by a sequencing mechanism at predetermined intervals.

6. A continuous film projection device in accordance with claim 5 wherein said sequencing mechanism includes a pair of spaced sequencing contacts in said circuit electrically connected to said release electro-magnet, the film passing in engagement with both of said sequencing contacts simultaneously during its travel from the coil through said projector and conducting means secured to the film at said predetermined intervals adapted to close the circuit between said sequencing contacts, thereby energizing said release electro-magnet to release said locking means and open said circuit to said drive means.

7. A continuous film projection device in accordance with claim 6 wherein said conducting means is a dab of a metallized paint.

8. A continuous film projection device in accordance with claim 6 wherein said sequencing contacts are positioned close to and preceding said lens opening in said projector.

9. A continuous film projection device comprising a projector having at least one drive means and a lens opening, a magazine supported adjacent said projector, said magazine including a supporting plate, a main reel and a plurality of idler reels arranged with said main reel on said supporting plate in non-contacting relation in substantially the form of a circle, said main reel and said idler reels being rotatably mounted on said supporting plate whereby a strip of film may extend about said main reel and said idler reels in a continuous coil having an innermost and an outermost layer with the innermost layer of the coil extending through said drive means of said projector to form an inverted U-shaped loop, passing said lens opening and returning to form the outermost layer of the coil, electrical power being provided to energize said drive means from a remote source, an electrical circuit between said source and said drive means, a pair of normally spaced contacts in said circuit, means to move said contacts into engaging relationship thereby closing said circuit, locking means to hold said contacts in engaging relationship and releasing means to release said locking means and open said circuit thereby, a fail safe being included in said circuit, said fail safe comprising a normally open micro-switch, means to close said micro-switch, an arm secured to said means to close said micro-switch, said arm normally resting on the film and maintaining said micro-switch closed when the film is taut and said arm falling by gravity when the film becomes slack and allowing said micro-switch to open.

10. A continuous film projection device comprising a projector having at least one drive means and a lens opening, a magazine supported adjacent said projector, said magazine including a supporting plate, a main reel and a plurality of idler reels arranged with said main reel on said supporting plate in non-contacting relation in substantially the form of a circle, said main reel and said idler reels being rotatably mounted on said supporting plate whereby a strip of film may extend about said main reel and said idler reels in a continuous coil having an innermost and an outermost layer with the innermost layer of the coil extending through said drive means of said projector to form an inverted U-shaped loop, passing said lens opening and returning to form the outermost layer of the coil, electrical power being provided to energize said drive means from a remote source, an electrical circuit between said source and said drive means, a pair of normally spaced contacts in said circuit, means to move said contacts into engaging relationship thereby closing said circuit, locking means to hold said contacts in engaging relationship and releasing means to release said locking means and open said circuit thereby, a test switch in said circuit bypassing said spaced contacts, said test switch closing said circuit when pressed to a closed position and spring means normally maintaining said test switch in an open position.

References Cited in the file of this patent

UNITED STATES PATENTS

| | | |
|---|---|---|
| 1,288,531 | De Vry | Dec. 24, 1918 |
| 1,463,620 | Larsen et al. | July 31, 1923 |
| 1,895,644 | Regan et al. | Jan. 31, 1933 |
| 2,319,092 | Spence | May 11, 1943 |
| 2,345,818 | Kelley | Apr. 4, 1944 |
| 2,353,154 | Fowler | July 11, 1944 |
| 2,398,639 | Heyer | Apr. 16, 1946 |
| 2,578,768 | Whitson | Dec. 18, 1951 |
| 2,781,689 | Heyer | Feb. 19, 1957 |
| 3,057,530 | Mees | Oct. 9, 1962 |

FOREIGN PATENTS

| | | |
|---|---|---|
| 253,994 | Great Britain | June 24, 1926 |